US012689319B2

(12) United States Patent
Kunze et al.

(10) Patent No.: US 12,689,319 B2
(45) Date of Patent: Jul. 21, 2026

(54) MODULAR SOLAR PANEL ENCLOSURE

(71) Applicant: Solar Stik, Inc., St Augustine, FL (US)

(72) Inventors: Matthew Bryan Kunze, Saint Augustine, FL (US); James Harlan Lewis, Saint Johns, FL (US)

(73) Assignee: Solar Stik, Inc., St. Augustine, FL (US)

( * ) Notice: Subject to any disclaimer, the term of this patent is extended or adjusted under 35 U.S.C. 154(b) by 0 days.

(21) Appl. No.: 18/665,399

(22) Filed: May 15, 2024

(65) Prior Publication Data

US 2025/0357881 A1      Nov. 20, 2025

(51) Int. Cl.
 *H02S 20/10*        (2014.01)
 *H02S 40/32*        (2014.01)

(52) U.S. Cl.
 CPC .............. *H02S 20/10* (2014.12); *H02S 40/32* (2014.12)

(58) Field of Classification Search
 CPC ...................................................... H02S 10/40
 See application file for complete search history.

(56) References Cited

U.S. PATENT DOCUMENTS

| | | | |
|---|---|---|---|
| 4,713,492 A | 12/1987 | Hanak | |
| 9,599,299 B2 | 3/2017 | Hoang | |
| 11,088,653 B1 | 8/2021 | Gupta | |
| 11,489,484 B2 | 11/2022 | Chentnik et al. | |
| 2007/0235604 A1* | 10/2007 | Speggiorin ............ | F16M 11/28 |
| | | | 248/177.1 |
| 2008/0163921 A1 | 7/2008 | Leong et al. | |

| | | | |
|---|---|---|---|
| 2014/0096811 A1 | 4/2014 | Oppizzi | |
| 2021/0221281 A1 | 7/2021 | Tohikian | |
| 2022/0149777 A1* | 5/2022 | Li ........................... | B63B 35/44 |
| 2024/0283398 A1* | 8/2024 | Sheffield ................ | H02S 20/30 |

FOREIGN PATENT DOCUMENTS

| | | |
|---|---|---|
| CN | 201662966 U | 12/2010 |
| CN | 214152352 U | 9/2021 |
| GB | 2498343 A | 7/2013 |
| IN | 201711027035 | 2/2019 |

(Continued)

OTHER PUBLICATIONS

N/A, 50 Watt Tripod Panel, Accessed Aug. 30, 2023; URL:<https://bosswatt.com/products/50-watt-tripod-solar-charger>.

(Continued)

*Primary Examiner* — Daniel P Malley, Jr.
(74) *Attorney, Agent, or Firm* — Lippes Mathias LLP; Mitchell Ghaneie; Josephine Chen

(57)        ABSTRACT

The present disclosure provides a solar panel enclosure having an assembled mode and a dissembled mode. The solar panel enclosure comprises a tripod and three solar panels detachably coupled to the tripod forming an enclosure. Each of the three solar panels has a substantial trapezoidal configuration and comprises a bottom edge, a top edge, and two side edge. The three solar panels are detachable coupled to one another on the two side edges by a joining mechanism. Each of the three solar panels further comprises a first portion having a plurality of first solar cells and a second portion having a plurality of second solar cells. The first portion is pivotally configurable about an axis relative to the second portion.

18 Claims, 8 Drawing Sheets

(56) References Cited

FOREIGN PATENT DOCUMENTS

| LU | 101223 | B1 | 11/2020 |
| WO | 2009073920 | A2 | 6/2009 |
| WO | 2018022655 | A1 | 2/2018 |

OTHER PUBLICATIONS

Min Ju Yun, Yeon Hyang Sim, Dong Yoon Lee, Seung I. Cha, Honeycomb-Structured 3D Concave Photovoltaic Modules Supported by 3D Mechanical Metamaterials for Enhanced Light Recapture, Nov. 11, 2022.

* cited by examiner

MODULAR SOLAR PANEL ENCLOSURE

FIELD OF THE INVENTION

The present disclosure relates generally to solar panels and more specifically to a modular solar panel enclosure that can be easily assembled and dissembled for convenient portability and provides encasement to electronic devices that are connected to the modular solar panel enclosure.

BACKGROUND OF THE INVENTION

During favorable weather conditions, people participate in outdoor activities and open-air events more frequently. Throughout these activities and events, attendees and organizers may necessitate different electrical equipment, such as light fixtures, sound systems, heating or cooling devices which may require a substantial amount of electricity. As managing electricity demands in outdoor settings is essential and the rise of environmental awareness, alternative power sources such as portable solar panels have been growing in popularity.

While it is understood that a variety of portable solar panels exists, conventional portable solar panels require a considerable amount of space either laying out flat on the ground or mounted on a stand in a tilted position. Further, electronic devices connected to conventional portable solar panels, connecting wires, extension cords are usually exposed to the open-air, which may appear cluttered or unorganized. Moreover, the electronic devices may be subject to dust, debris, environmental particles, or unpredicted weather exposures including unexpected rain or sudden winds, which may impact the functionality and lifespan of the electronic devices.

Consequently, there is a need for a portable solar panel that is compact, may be easily assembled and dissembled and provides an enclosure to protect electronic devices that are electronically connected to the portable solar panel.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention or the boundaries of its scope. Its sole purpose is to provide a rudimentary understanding of the invention's concept and features, which will be expounded upon in greater detail in the ensuing sections.

The present disclosure is generally directed towards to portable solar panels with enclosures to shelter electronically connected devices. An exemplary, nonlimiting embodiment of the present disclosure provides a modular solar panel enclosure, hereinafter referred to as the "solar panel enclosure", which may be easily assembled and dissembled for convenient portability and provides encasement to electronic devices that are electronically connected. The solar panel enclosure generally comprises three solar panels and a foldable tripod. At least one of the three solar panels further comprises an electronic device connector to provide energy to the electronic devices. The three solar panels are detachably coupled to the tripod, forming an enclosure which blocks environmental particles from contacting the electronic devices. Moreover, the enclosure may also shelter the electronic devices from unpredictable weather shifts, such as unexpected rain or sudden winds.

Each of the three solar panels has a substantially trapezoidal configuration with a resemblance to a triangle and comprises a top edge, a bottom edge and two side edges. Preferably, the trapezoidal configuration is an isosceles trapezoidal configuration, wherein lengths of the two side edges are identical. It is preferable that the three solar panels be constructed of flexible or bendable materials, such as fabric, having a plurality of solar cells laminated thereon. Each of the solar panels further comprises a first portion having a plurality of first solar cells and a second portion having a plurality of second solar cells. The first portion is pivotally configurable about an axis relative to the second portion. Preferably, the axis is parallel to the bottom edge of the of the solar panel, such that the first portion is disposed above the second portion, and the first portion may be folded downwards to the second portion. However, it is also anticipated that the axis may be perpendicular to the bottom edge, such that the first portion is on the left or right of the second portion.

The three solar panels may be detachably coupled to one another on the two side edges by a joining mechanism. Preferably the joining mechanism comprises zippers, but it is anticipated that alternative joining mechanisms, such as hook and loop fasteners, snap fasteners, or a combination thereof may be used to detachably join the three solar panels without departing from the spirit of the invention. It is also anticipated that the three solar panels are not detachably coupled to one another and each of the three solar panels are coupled to the tripod individually.

The tripod comprises a tripod head and three tripod legs. Each of the three tripod legs has a proximal end and a distal end. The three tripod legs are pivotally coupled to the tripod head, such that the tripod legs may expand radially around a peripheral of the tripod head and retract for storage. Preferably, the distal end of the tripod leg is coupled to a tripod foot which further includes a plurality of apertures configured to receive pegs, stakes, or screw for anchoring the solar panel enclosure to the ground.

In an assembled mode, the tripod is expanded with the three tripod legs pivoting outwards. The three solar panels are coupled to one another and coupled to the tripod, forming an enclosure configured to house electronic devices that are connected to the modular solar panel enclosure.

In a dissembled mode, the three solar panels are removed from the tripod. The tripod is retracted with the three tripod legs pivoting inwards. The three solar panels may be separated, and each of the solar panels may be folded along the axis, thereby reducing the volume for storage.

Furthermore, to assist a user handling and transporting the solar panel enclosure, each of the solar panels may further comprise a first handle on the top edge of the solar panel, and at least one second handle on an inner surface of each of the solar panels adjacent to the axis. The user may hold the first handle to fold the first portion to the second portion and seize the second handle to carry the folded solar panel.

The above features and advantages will become apparent from the following detailed description taken with the accompanying drawings.

NUMBER REFERENCES

10—Modular Solar Panel Enclosure
100—Solar Panel
100*a*—Bottom Edge
100*b*—Top Edge
100*c*—Side Edge
110—First Portion
111—First Solar Cell
120—Second Portion
121—Second Solar Cell
122—Skirt Portion
130—Joining mechanism
140—First Handle
142—Second Handle
150—Electronic Device Connector
160—Skirt Portion
200—Tripod
202—Tripod Head
204—Tripod Leg
206—Tripod Feet
210—Adjustment Mechanism
300—Mast

DETAILED DESCRIPTION OF THE INVENTION

The following detailed description and accompanying drawings provide a comprehensive disclosure of an exemplary embodiment for the purpose of facilitating one of ordinary skill in the relevant art to make and use the invention. As such, the detailed description and illustration of the one or more exemplary embodiments presented herein are purely exemplary in nature and are not intended to limit the scope of the invention or its protection in any matter. It is further noted that the drawings may not be to scale, and in some cases, certain details may be omitted which are not necessary for an understanding of the present invention, such as conventional details of fabrication and assembly. For purposes of description herein, the terms "top", "bottom", "side", "outer", "inner" and derivatives thereof shall relate to the device as oriented in FIG. 1. Furthermore, there is no intention to be bound by any expressed or implied theory presented in the preceding technical field, background, brief summary or the following detailed description.

The invention is directed to a modular solar panel enclosure, hereinafter referred to as the "solar panel enclosure" 10, that not only provides electricity and serves as a shelter to electronic devices but is also convertible between an assembled mode and dissembled mode for convenient portability and compact storage.

Figure 1:
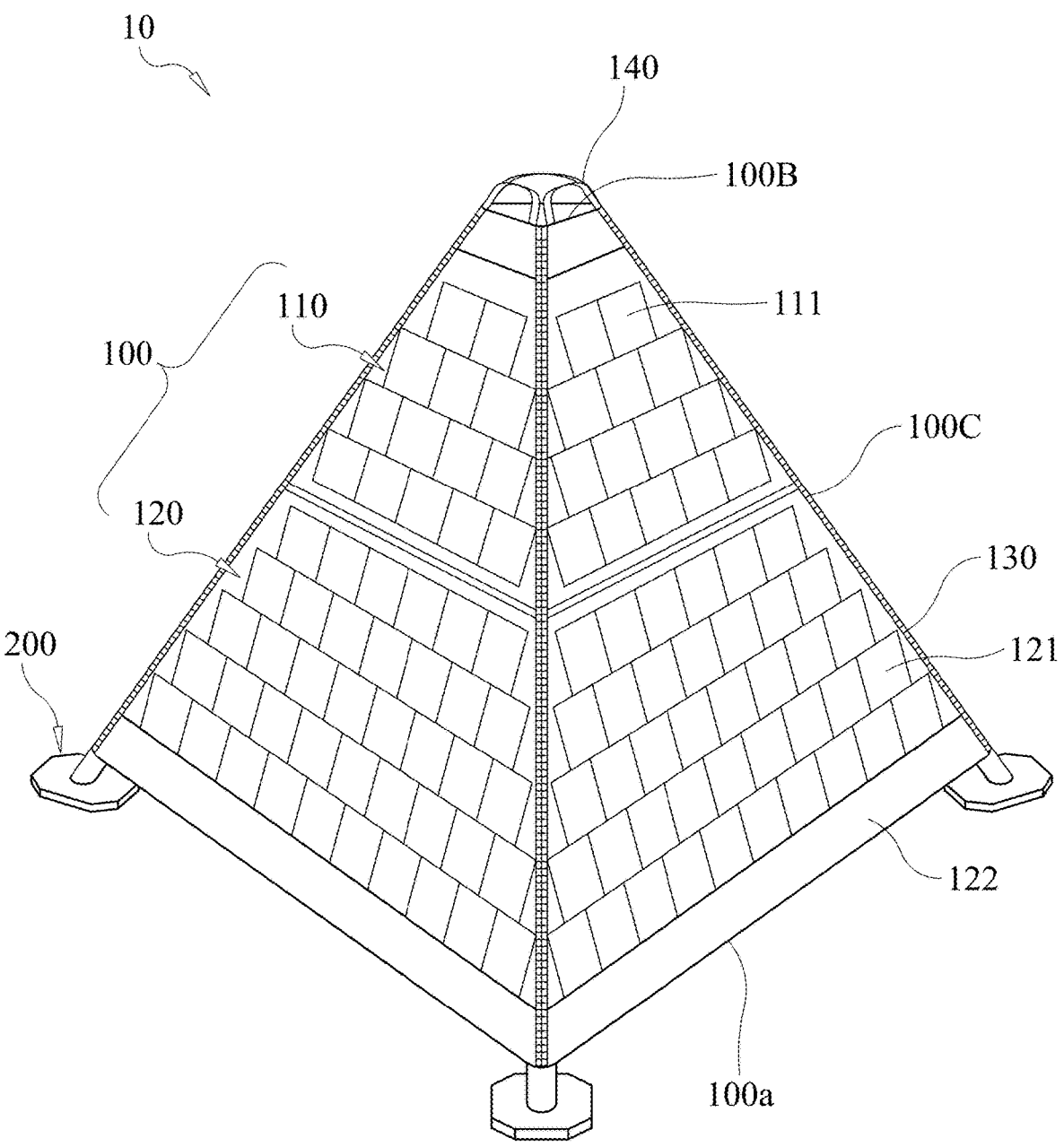
FIG. 1 is a front perspective view of an exemplary embodiment of a modular solar panel enclosure.
Figure 2:
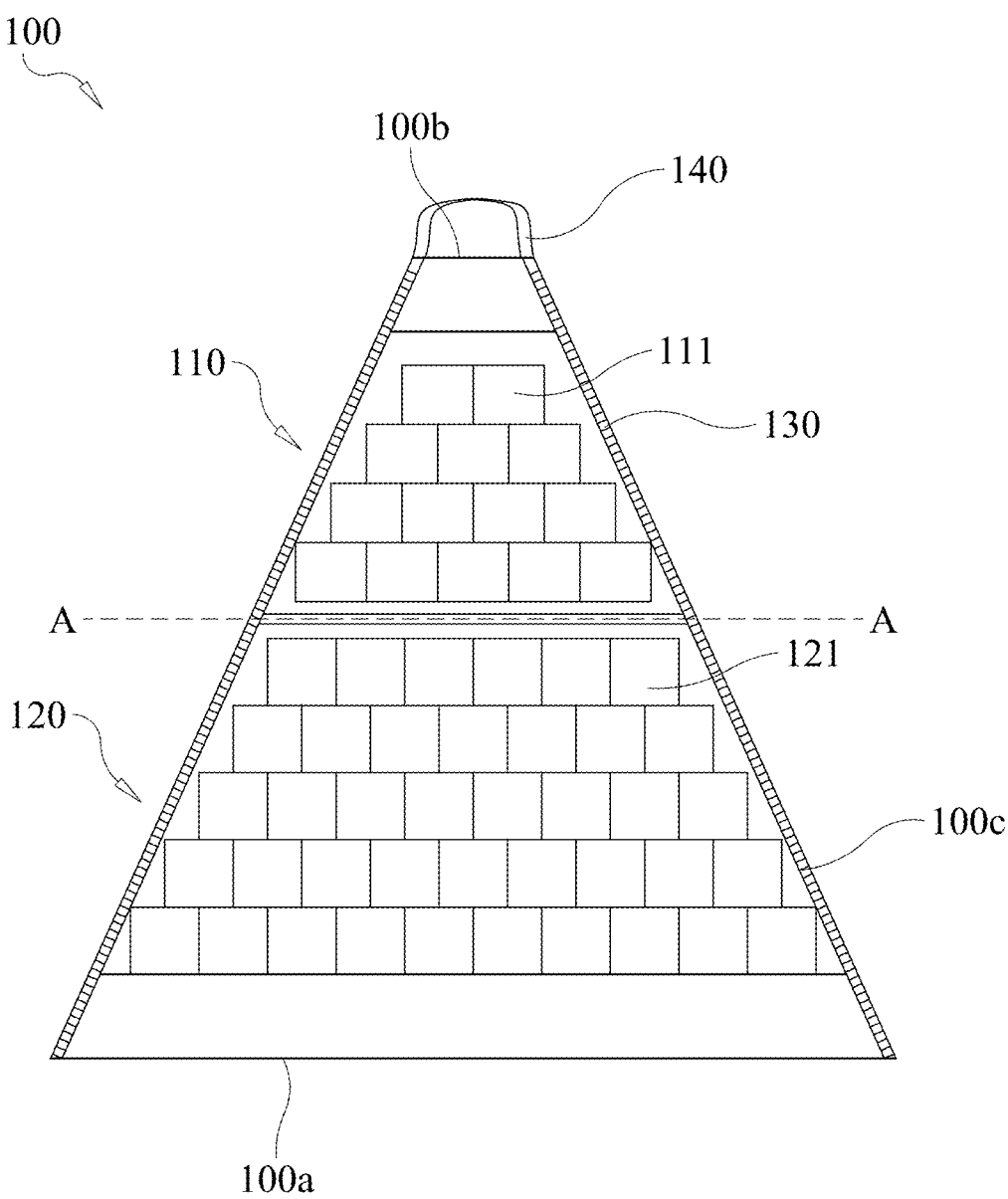
FIG. 2 is a front view of a solar panel of the exemplary embodiment of the modular solar panel enclosure.

Referring initially to FIG. 1 and FIG. 2, the solar panel enclosure 10 generally comprises a tripod 200 and three solar panels 100 detachably coupled to one another and further coupled to the tripod 200. Each of the three solar panels 100 has a substantial trapezoidal configuration in resemblance to a triangle, and has a bottom edge 100*a*, a top edge 100*b* positioned above and parallel to the bottom edge 100*a*, and two side edges 100*c*. In addition, each of the three solar panels 100 has an inner surface and an outer surface. Preferably, a length of the bottom edge 110*a* is greater than the top edge 100*b*, and the trapezoidal configuration is an isosceles trapezoid configuration having two equal side edges 100*c*. Each of the side edges 100*c* of the three solar panels 100 are joined together with one another by a joining mechanism 130. In the exemplary embodiment, the adjacent solar panels 100 comprise corresponding zipper teeth on the two side edges 100*c* with a zipper slider to assemble or dissemble the solar panels 100. However, it is anticipated that the joining mechanism 130 may vary in form, such as hook and loop fasteners, snap fasteners, straps for tying, without departing from the spirit of the invention.

Figure 3:
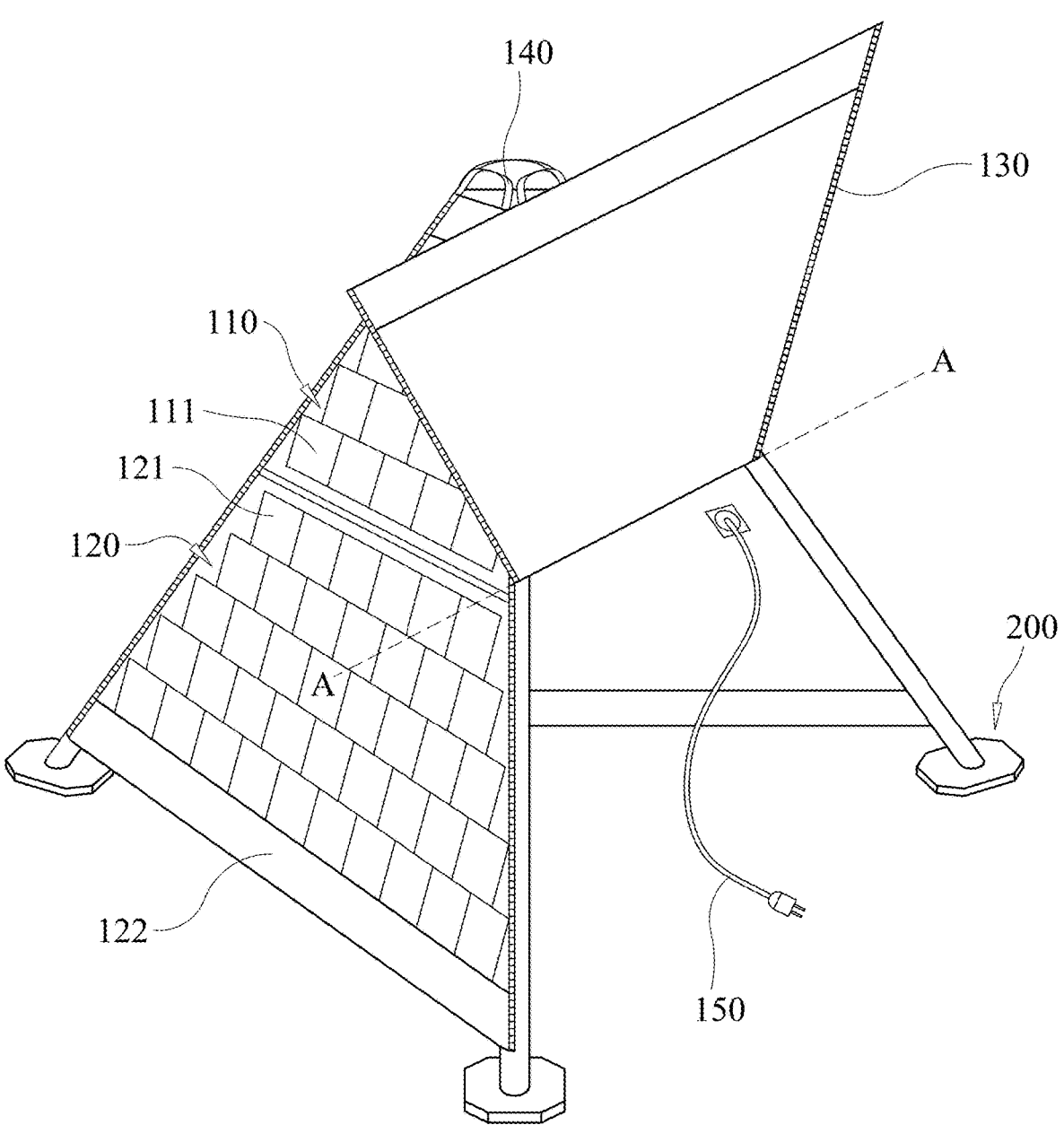
FIG. 3 is a perspective view of the exemplary embodiment of the modular solar panel enclosure with a solar panel pivoting about an axis.
Figure 4:
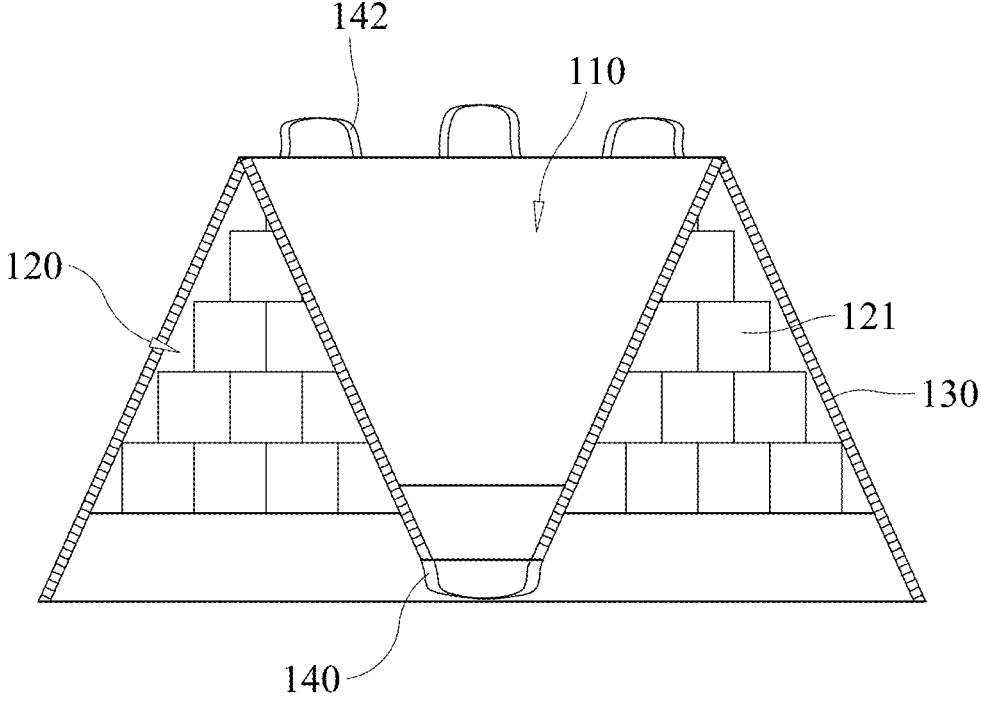
FIG. 4 depicts the solar panel being folded along the axis.

With continued reference to FIG. 2 and in conjunction with FIGS. 3 and 4, each of the three solar panels 100 further comprises an axis A-A dividing each of the solar panel 100 into a first portion 110 and a second portion 120. The first portion 110 may pivot about the axis A-A as shown in FIGS. 3 and 4. Furthermore, the first and second portion 110, 120 comprise a plurality of first and second solar cells 111, 121 respectively. It is preferable that the axis A-A is parallel to the bottom edge 100*a* and the three solar panels 100 be constructed of flexible or bendable materials, such as fabric or cloth, with the first and second solar cells 111, 121 laminated on the outer surface. At least one of the solar panels 100 further comprises an electronic device connector 150 on the inner surface configured to provide energy to the electronic device. Additionally, each of the solar panels 100 further comprise a first handle 140 on the top edge 100*b* and at least one second handle 142 on the inner surface adjacent to the axis A-A. Each of the solar panels 100 may further comprise a skirt portion 122 extending downwards from the second portion 120, such that second solar cells 121 are elevated from the ground.

Figure 7:
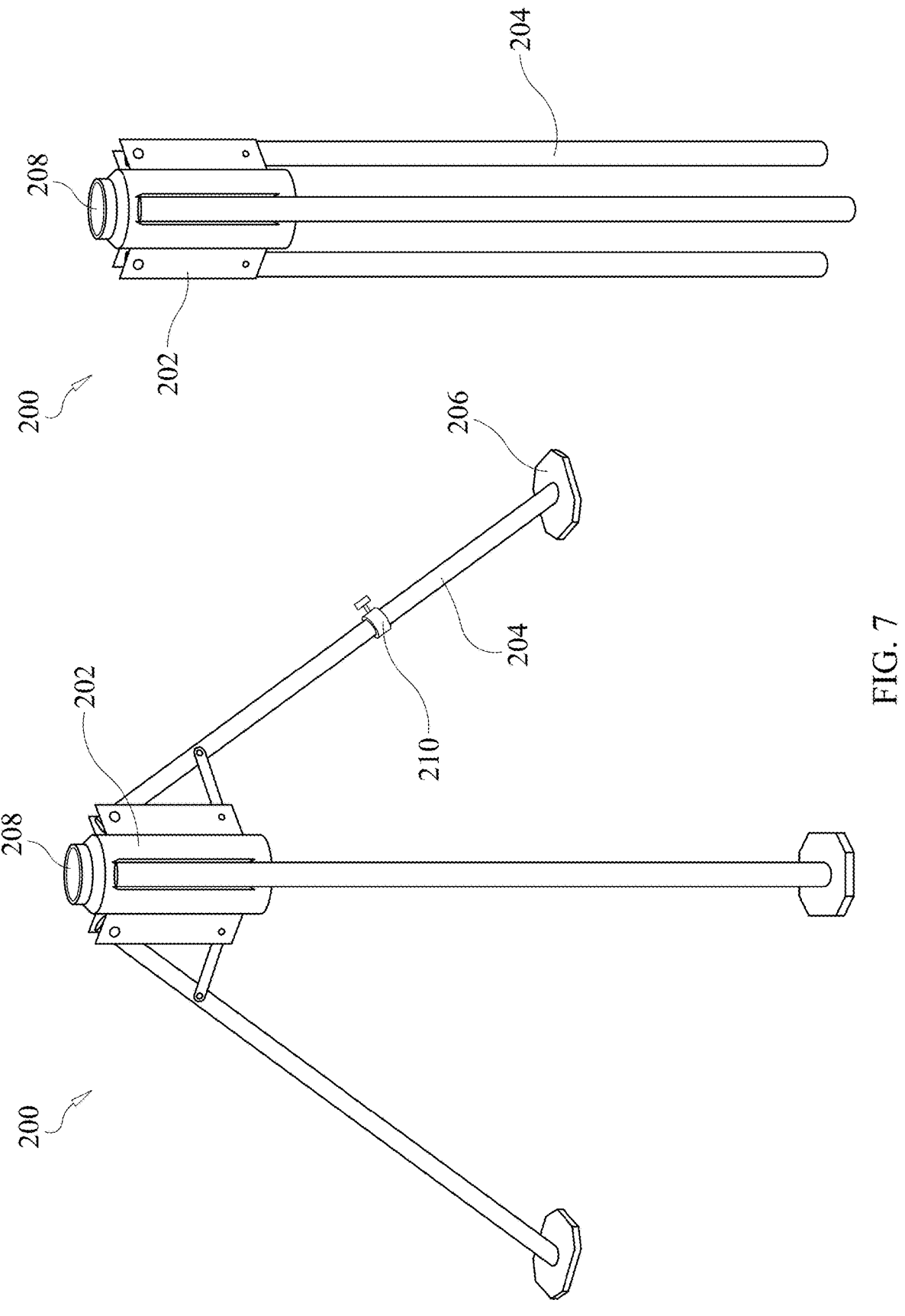
FIG. 7 depicts a tripod of the of the exemplary embodiment of the modular solar panel enclosure in an extended position and a retracted position.

Turning to the tripod 200, as shown in FIG. 7, the tripod 200 further comprises a tripod head 202, three tripod legs 204 pivotally attached to the tripod head 202, and three tripod feet 206 coupled to the tripod legs 204 respectively. Each of the tripod legs 204 has a proximal end and a distal end. In the assembled mode of the solar panel enclosure 10, each of the three tripod legs 204 pivots to extend radially from the proximal end of the tripod head 202. Each of three tripod feet 206 is coupled to each of the three tripod legs 204 respectively on the distal end to provide additional support. The three tripod legs 204 may further comprise apertures (not shown) to receive pegs, stakes, or screw for further securement to the ground.

In the dissembled mode of the solar panel enclosure 10, the three tripod legs 204 pivots inwards, such that the three tripod legs 204 are parallel to one another. Additionally, each of the three tripod legs 204 may be telescopic and further comprise an adjustment mechanism 210 to adjust the length of three tripod legs 204.

An exemplary method of using the solar panel enclosure 10 is presented herein to further demonstrate the convenience and simple conversion of the solar panel enclosure 10. It is anticipated that several steps may be sequentially interchangeable and equivalent application of one or more permutations of such sequentially interchangeable steps does not alter the spirit of the invention in any meaningful way.

Figure 5:
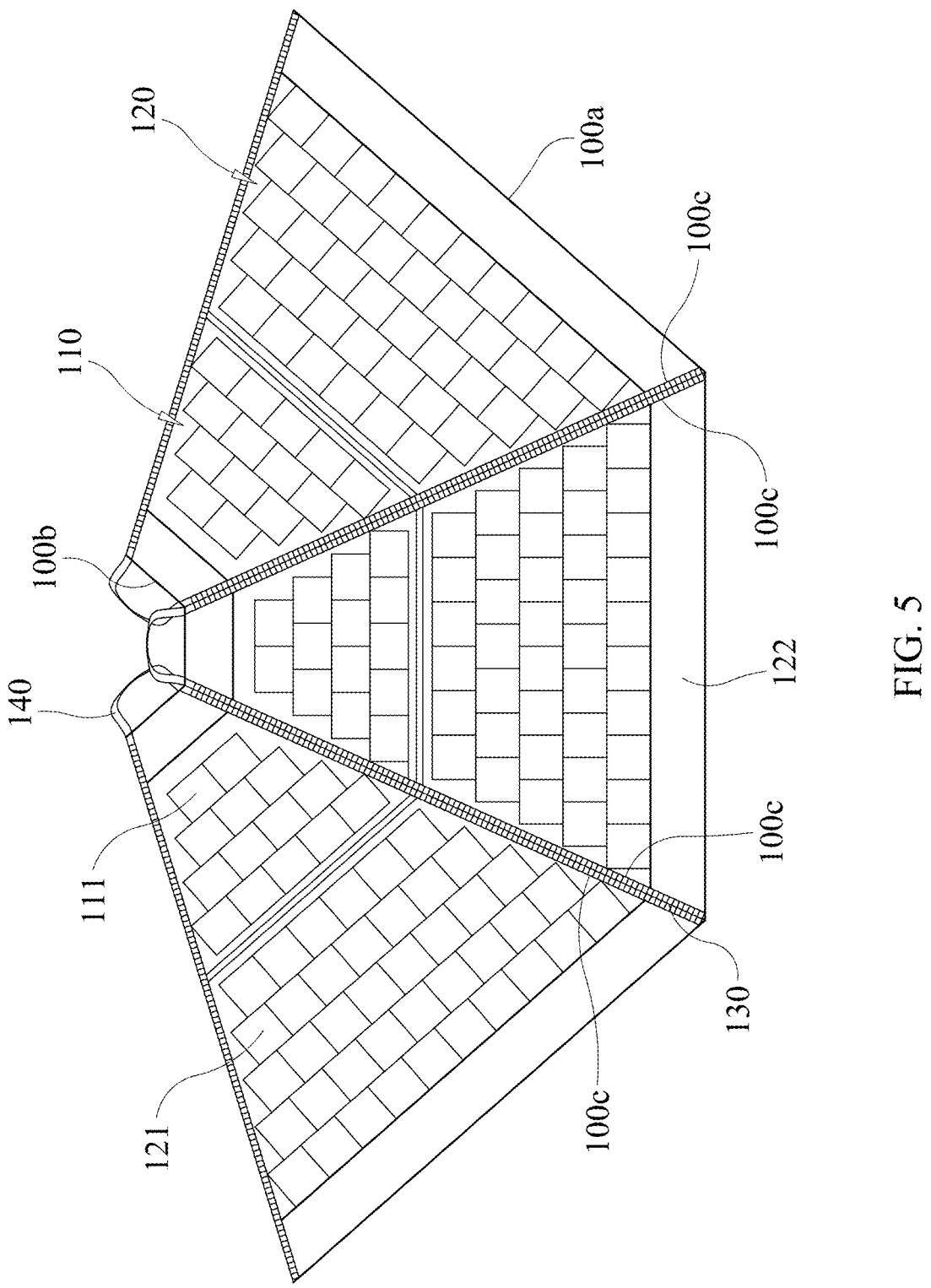
FIG. 5 depicts the solar panels being partially dissembled.

To implement the solar panel enclosure 10, an exemplary user expands the tripod 200, such that the three tripod legs 204 extend radially from the tripod head 202, as shown in FIG. 7. Next, as can be seen in FIG. 5, having the three solar panels 100 unfolded, the exemplary user then has one of the solar panels 100 zipped to the two other solar panels 100 on the two side edges 100c. Then, the exemplary user may wrap the solar panels 100 around the extended tripod 200 and zip the two side edges 100c that was not joined in the previous step. As a result, the solar panel enclosure 10 is in an assembled mode, as shown in FIG. 1, and forms an enclosure to house electronic devices. To place or adjust the electronic device within the solar panel enclosure 10, as shown in FIG. 3, the user may unzip the zippers upwards to the axis A-A on both sides of one of the solar panels 100, such that the second portion 120 of the solar panel 100 may pivot outwards to create an opening to the solar panel enclosure 10.

Figure 6:
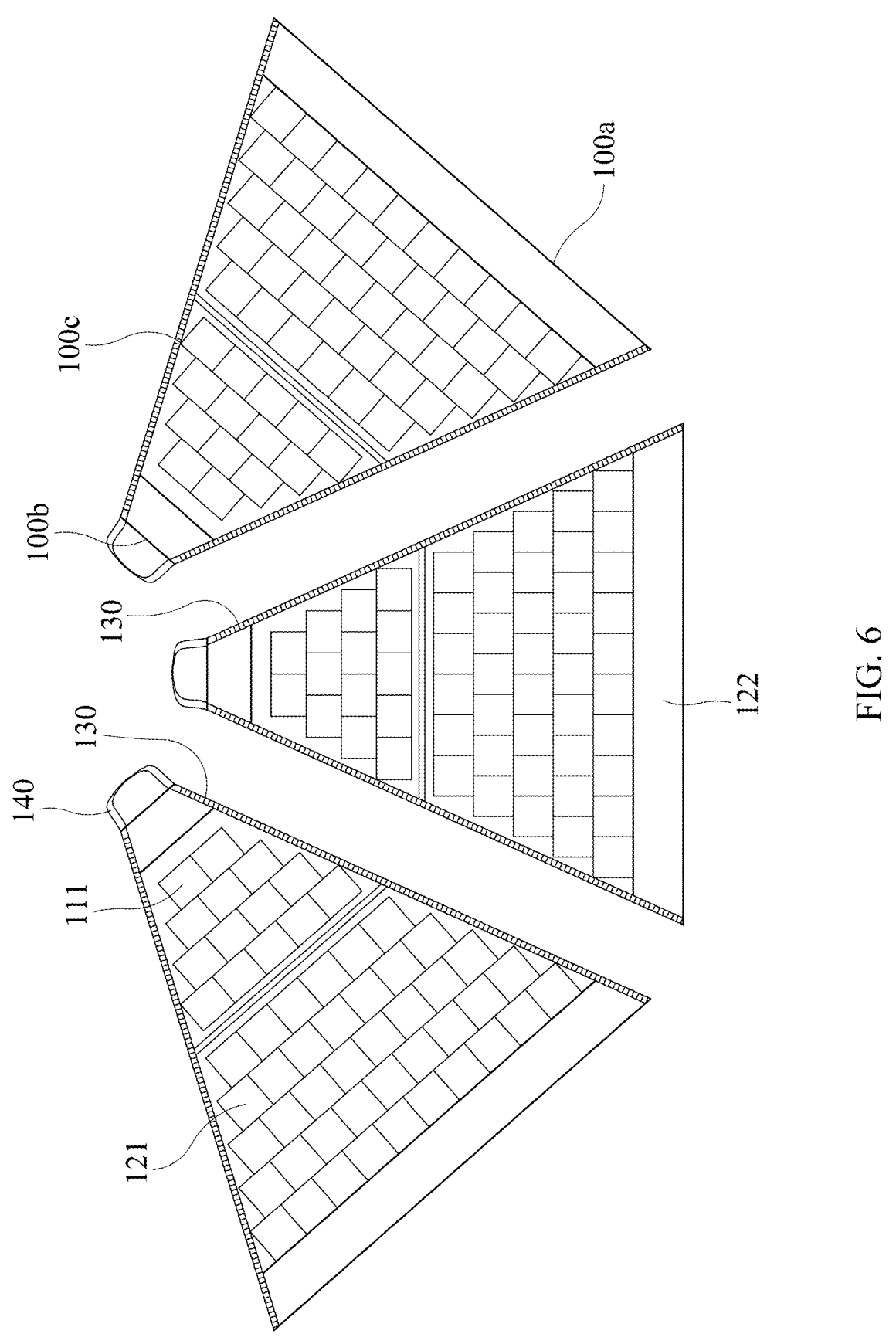
FIG. 6 depicts the solar panels being completely dissembled.

Upon completion of using the solar panel enclosure 10, the exemplary user unzips the zippers and removes the solar panels 100 from the tripod 200. Having the solar panels 100 unzipped to one another (FIG. 6), the exemplary user may further fold the upper portion 110 towards the second portion 120 (FIG. 4). Lastly, the exemplary user retracts the tripod 200. The solar panel enclosure 10 is in a dissembled mode and is convenient for transport and compact for storage.

Figure 8:
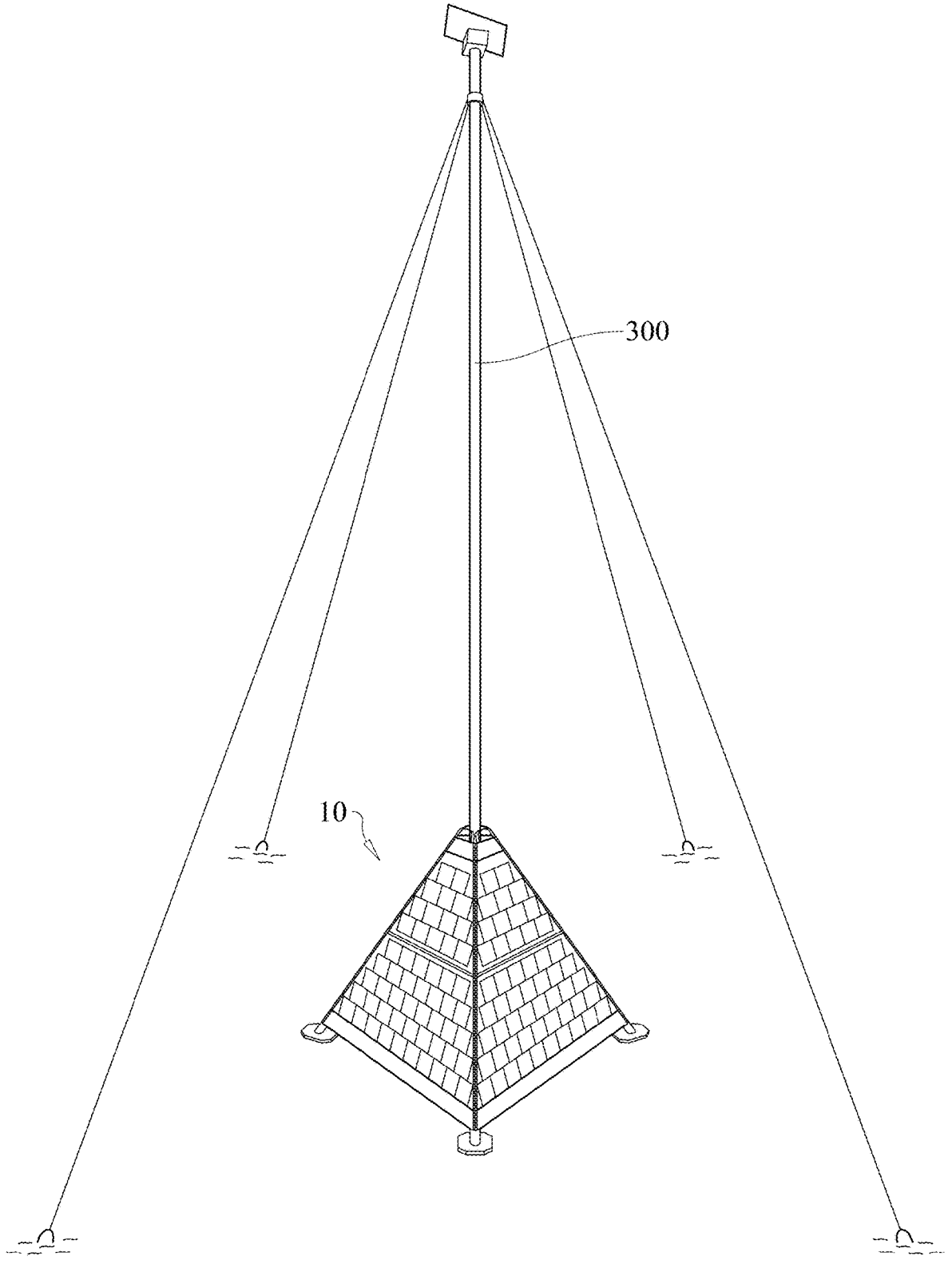
FIG. 8 depicts an expandable pole integrated with the exemplary embodiment of the modular solar panel enclosure.

As can be seen in FIGS. 7 and 8, the tripod head comprises a through hole 208 to receive an expandable mast 300.

In an alternative embodiment, each of the three solar panels 100 are coupled to the tripod 200 individually, instead of the three solar panels 100 joining to one another on the side edges 100c. The solar panels 100 may couple to tripod individually by fasteners including but not limited to hook and loop fasteners, snap fasteners, and straps.

In another aspect, the axis A-A may be perpendicular to the bottom edge 100a of each of the solar panels 100, such that the first portion 110 and the second portion 120 are equal in area, and each of the solar panels 100 may be folded in half.

While the exemplary embodiment of the present disclosure has been disclosed, certain modifications may be made by those skilled in the art to modify the invention without departing from the spirit of the invention.

The invention claimed is:

1. A modular solar panel enclosure, comprising:
three solar panels;
wherein each of the three solar panels has a substantial trapezoidal configuration;
wherein each of the three solar panels comprises a bottom edge, a top edge, and two side edges;
wherein a length of the bottom edge is greater than a length of the top edge;
wherein the three solar panels are detachable coupled to one another on the two side edges by a joining mechanism;
wherein each of the three solar panels further comprises a first portion having a plurality of first solar cells and a second portion having a plurality of second solar cells;
wherein the first portion is pivotally configurable about an axis relative to the second portion;
a tripod;
wherein the three solar panels are coupled to the tripod forming an enclosure; and an electronic device connector coupled to an inner surface of the at least one of the three solar panels and positioned within the enclosure, the electronic device connector configured to connect to an associated electronic device positioned within the enclosure.

2. The modular solar panel enclosure as claimed 1, the trapezoidal configuration is an isosceles trapezoid configuration.

3. The modular solar panel enclosure as claimed 1, wherein the joining mechanism comprises zippers, hook and loop fasteners, snap fasteners, or a combination thereof.

4. The modular solar panel enclosure as claimed 1, wherein the axis is parallel to the bottom edge of each of the three solar panels.

5. The modular solar panel enclosure as claimed 1, wherein the tripod further comprises a tripod head, three tripod legs, and three tripod feet; wherein each of the three tripod legs has a proximal end and a distal end; and wherein each of three tripod feet is coupled to each of the three tripod legs respectively on the distal end.

6. The modular solar panel enclosure as claimed 1, wherein each of the three tripod legs pivotally attaches to and radially extends from the tripod head on the proximal end.

7. The modular solar panel enclosure as claimed 1, wherein the tripod head comprises a through hole to receive an expandable mast.

8. The modular solar panel enclosure as claimed 1, wherein the top edge of each of the three solar panels comprises a handle.

9. The modular solar panel enclosure as claimed 1, wherein each of the three solar panels has an outer surface and an inner surface; and wherein the inner surface comprises at least one handle adjacent to the axis.

10. The modular solar panel enclosure as claimed 1, wherein adjacent to the bottom edge of each of the three solar panels comprises a skirt portion extending from the second portion.

11. A modular solar panel enclosure, comprising:
three solar panels;
wherein each of the three solar panels has a substantial trapezoidal configuration;
wherein each of the three solar panels comprises a bottom edge, a top edge, and two side edges;
wherein a length of the bottom edge is greater than a length of the top edge;
wherein each of the three solar panels further comprises a first portion having a plurality of first solar cells and a second portion having a plurality of second solar cells;
wherein the first portion is pivotally configurable about an axis relative to the second portion;
a tripod;
wherein each of the three solar panels are coupled to the tripod respectively forming an enclosure; and
an electronic device connector coupled to an inner surface of the at least one of the three solar panels and positioned within the enclosure, the electronic device connector configured to connect to an associated electronic device positioned within the enclosure.

12. The modular solar panel enclosure as claimed 10, the trapezoidal configuration is an isosceles trapezoid configuration.

13. The modular solar panel enclosure as claimed 10, wherein the axis is parallel to the bottom edge of each of the three solar panels.

14. The modular solar panel enclosure as claimed 10, wherein the tripod further comprises a tripod head, three tripod legs, and three tripod feet; wherein each of the three tripod legs has a proximal end and a distal end; and wherein each of three tripod feet is coupled to each of the three tripod legs respectively on the distal end.

15. The modular solar panel enclosure as claimed 10, wherein the tripod head comprises a through hole to receive an expandable mast.

16. The modular solar panel enclosure as claimed 10, wherein the top edge of each of the three solar panels comprises a handle.

17. The modular solar panel enclosure as claimed 10, wherein each of the three solar panels has an outer surface and an inner surface; and wherein the inner surface comprises at least one handle adjacent to the axis.

18. The modular solar panel enclosure as claimed 10, wherein adjacent to the bottom edge of each of the three solar panels comprises a skirt portion extending from the second portion.

\* \* \* \* \*